United States Patent [19]
Gehri

[11] 3,718,733
[45] Feb. 27, 1973

[54] CATALYTIC TREATMENT OF EXHAUST GASES

[75] Inventor: Dennis C. Gehri, Granada Hills, Calif.

[73] Assignee: North American Rockwell Corporation

[22] Filed: Feb. 20, 1970

[21] Appl. No.: 13,246

[52] U.S. Cl. ............... 423/213, 423/239, 423/240, 423/246, 23/288 A, 23/288 F, 60/274, 60/282, 60/301
[51] Int. Cl. ..................... B01d 47/02, B01d 53/34
[58] Field of Search ......23/2, 2 E, 3.1, 2 S, 157, 159, 23/161, 104, 2 D; 60/29 R, 29 A, 30 R, 30 L

[56] References Cited

UNITED STATES PATENTS

| | | |
|---|---|---|
| 3,259,453 | 7/1966 | Stiles...................................23/2 E |
| 3,563,029 | 2/1971 | Lowes......................................60/30 |
| 3,505,018 | 4/1970 | Bawa et al. .........................23/150 X |
| 3,438,722 | 4/1969 | Heredy et al................................23/2 |
| 3,565,574 | 2/1971 | Kearby et al............................23/2 E |
| 2,375,758 | 5/1945 | Bates..................................23/104 X |
| 3,228,746 | 1/1966 | Howk et al..............................23/2 E |

Primary Examiner—Earl C. Thomas
Attorney—L. Lee Humphries, Henry Kolin and Thomas S. MacDonald

[57] ABSTRACT

Nitrogen oxides are removed from a waste gas by reaction with carbon monoxide in the presence of a wire mesh selected from copper-containing alloys. Where the exhaust gas contains lead species or other impurities which tend to poison the catalyst, the exhaust gas contacts a molten alkali metal carbonate mixture which removes the lead species prior to the gas contacting the catalyst. Other poisonous impurities such as sulfur dioxide are also removed by the carbonate mixture.

14 Claims, 3 Drawing Figures

INVENTOR.
DENNIS C. GEHRI

BY Henry Kolin
ATTORNEY

CATALYTIC TREATMENT OF EXHAUST GASES

BACKGROUND OF THE INVENTION

The herein invention relates to the removal of nitrogen oxides, $NO_x$, from waste gases. Further, the invention particularly relates to the removal of nitric oxide from automotive exhaust gas. The aforegoing are accomplished by reacting $NO_x$ with carbon monoxide in the presence of a particular catalyst surface. Additionally, the invention relates to removal of carbon monoxide and hydrocarbons from exhaust waste gases. In an automotive exhaust, the gas is contacted with a molten salt mixture which removes lead species from the gas prior to it contacting the catalyst surface.

Nitrogen oxides, principally NO and $NO_2$, are present in the waste gases discharged from many metal refining and chemical plants, in the flue gases from power plants generating electricity by the combustion of fossil fuels, and in the exhaust gas from internal combustion engines. The control of air pollution resulting from the discharge into the atmosphere of waste gases containing these nitrogen oxides has become increasingly urgent.

Typical concentrations of nitrogen oxides in waste gases are 200 to 1,000 ppm from electric generating plants, 100–5,000 ppm from automobiles, and 1,000–4,000 ppm from fertilizer plants. Removal of the nitrogen oxides from the waste gases is often difficult and expensive because of the large volume of waste gases relative to the quantity of nitrogen oxides which they contain. Of particular interest is the presence of nitrogen oxides in the exhaust gas of internal combustion engines. It is a well established fact that nitrogen oxides contribute to the production of photochemical smog. As a result, limitations have been placed upon the amount of nitrogen oxides that can be produced by automobiles in order to limit their ability to produce photochemical smog.

Various attempts have been made to remove the nitrogen oxides from exhaust waste gases. For example, in automotive exhaust, catalytic decomposition or catalytic reduction has been attempted to convert the nitrogen oxides present to nitrogen and oxygen, or to nitrogen and $CO_2$. The decomposition, however, has been too slow for the relatively short residence time that can be afforded in a practical muffler design or unit for utilization on an automobile. Additionally, the methods have not been practical from the standpoint of replacement of catalyst, cost, complexity of structure and weight penalties to the automobile. Further, it has been found that the catalyst is often poisoned by lead species, sulfur dioxide, and carbonaceous material present. Thus, to date there has not been a suitable economical means for the removal of nitrogen oxides from automotive exhaust or stationary sources.

SUMMARY OF THE INVENTION

It is an object of the present invention to provide a method and exemplary devices for the removal of nitrogen oxide impurities together with solid particulate matter from waste gases. The removal devices utilize inexpensive and readily available materials together with simple equipment.

It has been known that carbon monoxide can promote the removal of nitrogen oxides from exhaust gases in the presence of supported metal oxide catalysts which serve as a surface for the reaction. In accordance with the herein invention, it has unexpectedly been discovered that a metal wire mesh comprised of copper-containing alloys, particularly the Monel and cupronickel alloys most efficiently promote the reaction. The copper alloy contains from 5 to 95 weight per cent copper. In its preferred aspects it comprises from 5 to 95 wt. percent copper and from 5 to 95 wt. percent nickel. The Monel alloys having a copper content between about 25 and 35 wt. percent copper, a nickel content between about 60 and 70 wt. percent, and optionally containing amounts of iron up to 6.5% and lesser amounts of manganese, silicon, and carbon are particularly effective and preferred in the practice of this invention, providing substantially complete removal of the nitrogen oxides at residence times of 0.2 seconds and less. While the mesh may be wetted by a molten carbonate salt mixture, as will be further discussed, most effective and rapid removal of nitrogen oxides occurs when the metal catalytic surfaces are in an unwetted, dry state.

The introduction of lead species, e.g., lead, lead halides, and other lead-containing compounds, into the exhaust gas stream significantly reduces the efficiency of the aforegoing reaction between the nitrogen oxides and CO by apparently poisoning the metal mesh surface. As a result, it is preferred that the exhaust gas is first contacted with a material that will sufficiently remove such lead-containing species and other poisons found in the exhaust gas prior to the gas being directed over the metal mesh surface. Thus, it is particularly desirable to contact the exhaust gas with a molten salt mixture containing a eutectic mixture of alkali metal carbonates, which mixture has high efficiency for the removal of lead-containing species. In fact, since these same lead materials poison virtually any catalyst used, it is desired to first pass the exhaust gas through the molten salt prior to contacting any such catalyst. In one embodiment of the invention, the exhaust gas after passing through the dry mesh can be further reacted with air to oxidize any excess CO present in the exhaust gas, converting it to $CO_2$. Further, certain unburned hydrocarbon can be oxidized at the same time. The reaction between CO and $O_2$ is catalyzed in the presence of a dry metal mesh in the same manner as is the CO—$NO_x$ reaction. The molten carbonate may contain coke or other suitable carbonaceous material which helps to regenerate the carbonate. Further, it has been found that a metal mesh wetted with coke and molten carbonate will efficiently remove NO when $CO_2$ is present in the exhaust gas.

A device which can be utilized with automobiles can comprise an impingement scrubber where the gas leaving the exhaust manifold can be directed into a mixture of molten carbonate and coke, with a metal mesh being present to de-entrain the molten carbonate from the exhaust gas as well as promoting reaction in this region. The gas then could be conducted through an exhaust pipe to a muffler replacement unit which can comprise both a dry mesh region to allow the reaction between CO and $NO_x$ to occur, and a second mesh region in which air is admitted to convert excess CO to $CO_2$, as well as oxidize hydrocarbons.

DESCRIPTION OF PREFERRED EMBODIMENTS

Figure 1:
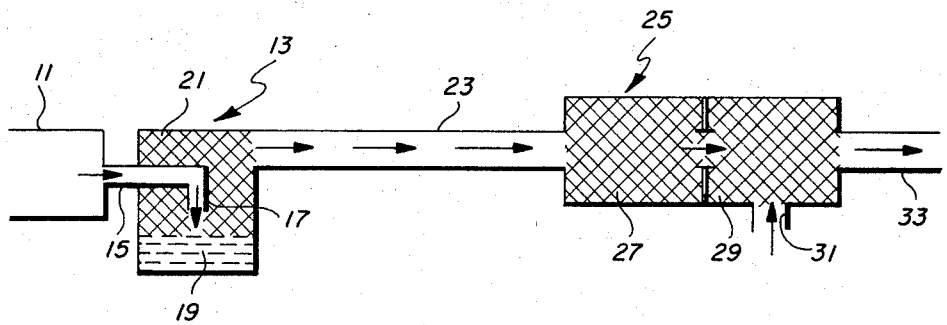
FIG. 1 is a schematic representation of a first device suitable for utilization with an internal combustion engine to remove undesirable constituents from the exhaust gas stream.

In copending application, Ser. No. 13,248 filed Feb. 20, 1970, there is disclosed a method for removing gaseous and particulate impurities from waste gases by contacting the waste gases with a molten alkali metal carbonate mixture. The gaseous impurities are absorbed by the carbonate mixture. In some instances, depending upon the particular impurity, the absorbent carbonate mixture is regenerated. The copending application is particularly directed to the removal of nitrogen oxides, halogens, halides, metal oxides, oxides and organic compounds of elements of Group VA of the Periodic Table, hydrogen-containing acids and acid anhydrides, and organic sulfur-containing compounds. As disclosed in that application, a molten carbonate mixture can serve as an active absorbent to remove nitrogen oxides from exhaust gases. As disclosed therein, the removal of the nitrogen oxides is further enhanced when they are contacted with the molten carbonate in the presence of a packing which serves to increase the contact area between the carbonate and the nitrogen oxide.

It has been additionally discovered that nitrogen oxides, $NO_x$, can be removed from exhaust gas in the absence of a molten carbonate mixture. In accordance with the present invention it has been discovered that $NO_x$ can be effectively removed from exhaust gases where carbon monoxide is present and there is a particular catalytic surface to effect the reaction between the two gases. Unexpectedly outstanding results are obtained when the catalyst is comprised of a wire mesh of a copper-containing alloy, such as Monel. It is postulated that the following chemical mechanisms could occur in the presence of the catalytic surface for the CO-promoted $NO_x$ removal:

1.a

$$2(CO)_{ads} + 2(NO)_{ads} \rightarrow (N_2)_g + (CO_2)_g$$

1.b

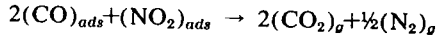

$$2(CO)_{ads} + (NO_2)_{ads} \rightarrow 2(CO_2)_g + \tfrac{1}{2}(N_2)_g$$

where: ads refers to adsorbed species and g refers to gaseous species

It is found that the above reactions are independent of $CO_2$ concentrations in the gas stream. However, they appear to be dependent upon the oxygen concentration. Results indicate that if the oxygen concentration in the exhaust gas exceeds one-half the CO concentration, no $NO_x$ removal is obtainable. It has been shown that in this case, at high oxygen concentration, the catalytic mesh surface quantitatively reacts adsorbed CO and oxygen to produce $CO_2$ in accord with the following exemplary reaction:

2.

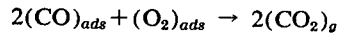

$$2(CO)_{ads} + (O_2)_{ads} \rightarrow 2(CO_2)_g$$

As seen from the above Reaction 2, CO removal can be obtained by reacting it with oxygen in the presence of a catalytic mesh surface. Further, in view of Reaction 2, it has been found that Reactions 1 are only efficient when the exhaust gas stream has an oxygen concentration less than one-half that of CO. In other words, there should not be enough oxygen present in the exhaust gas to convert all of the CO present to $CO_2$.

It should thus be apparent from the foregoing, that the removal of the $NO_x$ by CO in accord with Reactions 1 is well suited for automotive exhaust, since CO is normally present in such exhaust, while the oxygen concentration is usually low. Further, proper engine adjustment can provide the necessary concentration of CO except under deceleration conditions, at which time little $NO_x$ is formed. There is little need for concern over the generation of CO in automotive exhaust, since the excess CO unreacted with $NO_x$ can be subsequently converted to $CO_2$ in accord with Reaction 2 above, prior to the gas leaving the exhaust train. Though the postulated mechanism of this invention is most ideally suited for automotive exhaust, it should be apparent that any $NO_x$-containing exhaust gas can benefit from Reactions 1 above, where the exhaust gas additionally contains CO or CO can be readily or feasibly added to the exhaust gas to promote the reaction.

As indicated, unexpectedly outstanding results are obtained when a copper-containing alloy, such as the Monel series, is used as the catalytic surface. As will be shown, one hundred percent nitrogen oxide removal efficiencies have been obtained utilizing this type of catalyst. One of the most unexpected results obtainable with this type of mesh is that extremely high efficiencies of NO removal are obtained for very short residence times of an exhaust gas in contact with the mesh. For example, 95 percent removal of NO has been obtained during a residence time of only 0.08 second with a Monel mesh catalyst. The term copper-containing alloy is meant to include alloys containing at least 5 weight percent copper. It is preferred to use alloys that contain predominantly copper and nickel. The copper content can vary between 5 and 95 weight percent while the nickel content can vary between 5 and 95 weight percent. In the Monel series of alloys the copper content generally varies between 25 and 35 wt. percent while the nickel content will range between 60 and 70 wt. percent, and amounts of iron up to 6.5 percent, and lesser amounts of manganese, silicon, and carbon may be present. In the cupronickels the copper content varies from 70 to 95 percent while the nickel content is between 5 and 30 percent.

The exhaust gas which contains $NO_x$ and CO can be passed through a vessel or reactor which is packed with the metal mesh utilized as a catalytic surface. The term mesh as used herein refers to interlocked or interwoven elongated metal wires, fibers, ribbons, or filaments. Also, coiled wire and wire-wool configurations may be used. A particularly preferred mesh construction for use in the practice of this invention is a loosely woven wire cloth wherein the warp and woof are so arranged as to minimize laminar gas flow, promote metal-gas contact, and provide for uniform distribution of the gas over the catalytic metal surfaces. The mesh is then shaped to conform to the configuration of the container in which it is held, and is essentially self-supporting therein. The mesh should not be so dense as to unduly impede the flow of gas therethrough. Preferably the solid wire should constitute less than 15 percent of the volume occupied by the mesh. The wire used in the mesh may be of circular, flat, or ribbon-like cross section, and its size depends upon various factors including corrosion resistance, maximizing surface area per unit volume, as well as the allowable pressure drop across the mesh. Typical wire diameters can vary between 4 and 11 mils. However, a much greater range of round or flat wire size is contemplated as being suitable taking into consideration the factors mentioned above. For a 7 mil diameter wire, a typical mesh useful for the herein invention can have a density of 0.5 gram of wire per cubic centimeter of space containing the mesh.

The weave of the mesh is not critical. Enough mesh should be present to promote the desired catalytic effect. Obviously, the size of the packed reactor should allow sufficient residence time between the exhaust gas and the packing so that the above Reactions 1 can occur. However, it is pointed out that one of the advantages of the invention is that Reactions 1 have been found to occur on the Monel mesh at relatively short residence times, of for example 0.08 to 0.4 seconds. Though the reaction efficiency increases with increasing temperature, for a given residence time the reaction has been specifically demonstrated as being successfully accomplished between 250° C. and 625° C. Preferably, the reaction is carried out at temperatures above 300° C.

As can be seen from the above discussion, a mesh surface of Monel or other metal material can effectively remove $NO_x$ from exhaust gases which also have CO present. As pointed out, there is normally sufficient CO and a low percentage of oxygen in automotive exhaust so that the reactions can be effected. Most automotive gasoline contains a lead additive, normally in the form of tetraethyl lead, or the like, to improve antiknock properties. Further, the gasolines contain various halogen or halogen-containing scavengers which serve to react with lead particles formed in the engine. Due to the presence of these materials, lead halides are formed and ejected from the engine in the exhaust gas. It has been found that lead halides significantly reduce the ability of the metal mesh or other catalysts to catalyze the CO—$NO_x$ reaction. In other words, materials such as lead chloride or the like that often exist in the exhaust gas, poison the metal mesh or other catalytic surface, preventing them from being utilized in a practical automotive device.

In the referred to copending application, Ser. No. 13,248 it is shown that a molten carbonate mixture can effectively remove lead particles, lead halides, and halogens from automotive exhaust. As disclosed therein, the reaction between a molten carbonate salt and lead halides, e.g., PbClBr, is virtually instantaneous and is believed to occur in accord with the following exemplary reaction:

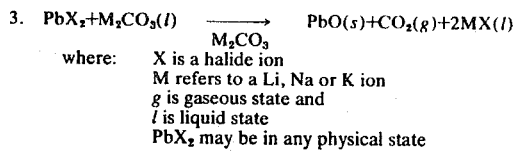

3. $PbX_2 + M_2CO_3(l) \xrightarrow{M_2CO_3} PbO(s) + CO_2(g) + 2MX(l)$ where: X is a halide ion
M refers to a Li, Na or K ion
g is gaseous state and
l is liquid state
$PbX_2$ may be in any physical state The molten salt mixture utilized contains alkali metal carbonates as an active absorbent for the lead halides. Where diluent salts are present in amounts up to 90 weight percent the melting point of the salt mixture containing the alkali metal carbonate absorbent may be as low as 350° C. Where the melt consists essentially of only the alkali metal carbonates, a ternary mixture consisting of potassium carbonate, lithium carbonate, and sodium carbonate is utilized at a reaction temperature between 400° C. and 600° C. While the individual melting points of the three alkali metal carbonates fall within the range of 725° to 900° C., the eutectic mixture containing equal amounts by weight of the carbonates of potassium, lithium and sodium has a melting point of about 395° C. Since the temperature of an automotive exhaust, measured at the exhaust manifold, exceeds 500° C. when the automobile has achieved running speeds, it is readily apparent that the exhaust gas is sufficiently hot to melt the carbonate. Suitable molten salt compositions are further described in copending application, Ser. No. 13,248.

Since it has been demonstrated that alkali metal carbonate mixture will effectively remove lead halide impurities upon contact therewith, it is particularly desirable to pass the exhaust gas from an internal combustion engine through a scrubber containing the molten carbonate prior to contacting the exhaust gas with the dry metal mesh of the invention. Thus, one of the novel aspects of this invention is the utilization of a molten alkali metal carbonate scrubber to remove poisonous lead and lead-containing materials with a dry metal mesh serving as a catalyst for the CO-promoted removal of nitrogen oxides from internal combustion engine exhaust gas.

In addition to the catalyst-poisoning lead compounds present in automotive exhaust, it has been previously reported that sulfur-containing compounds such as $SO_2$ are found in the exhaust and will also poison catalyst surfaces. In U.S. Pat. No. 3,438,722, there has been disclosed the effective removal of sulfur oxides from waste gases by passing them through the herein described molten alkali metal carbonate mixture. Thus, in the practice of the present invention, when utilizing the molten carbonate, sulfur oxide poisons are effectively removed prior to the exhaust gas contacting the dry metal catalytic mesh.

As pointed out, it has been demonstrated that Reactions 1 will most efficiently remove $NO_x$ from exhaust gases in the presence of a particular dry metal mesh. However, for practical applications, it is particularly desirable that the reaction be carried out over a large range of operating conditions of the automobile. The metal mesh becomes poisoned, as indicated, by any lead halides in the automobile exhaust, and thus would require constant changing by way of a replaceable cartridge or the like, in the automotive muffler unit or similar device. By the unique combination of a molten alkali metal carbonate mixture scrubber with the dry mesh, the lifetime thereof is considerably extended so that it becomes extremely practical for applications in an automotive exhaust system.

It has further been found that Reactions 1 can be carried out in the presence of a dry metal mesh comprised of an alloy which does not contain a significant amount of copper. For example, the reaction will take place in the presence of a stainless steel mesh. Prior art techniques for achieving Reactions 1 have involved contacting the exhaust gas with a supported metal oxide catalyst. The utilization of such catalysts in automotive devices presents problems because of heat-up periods, attrition, hot temperature sintering, and lead-fouling. Except for lead fouling, which is apparently detrimental to any known catalyst, a wire mesh is superior to supported catalysts in terms of the above-mentioned problem areas. Further, a wire mesh will remain permanently with a device and not be carried out in the exhaust stream. Thus, it can be seen that several advantages exist from the discovery of the use of metal mesh to serve as a catalyst for Reactions 1.

Additionally, as part of the herein invention, the use of molten carbonate together with any catalyst which promotes Reactions 1 is contemplated as a novel combination to prevent lead poisoning of the catalyst.

As indicated, another one of the novel aspects of the invention is the discovery that a dry metal mesh improves the efficiency of the removal of $NO_x$ from exhaust gases as compared to the same mesh when wetted with the molten carbonate mixture. Thus it is particularly desirable that the exhaust gas leaving a molten carbonate scrubber be sufficiently demisted so that the entrained molten carbonate is not carried from the scrubber. Thus, it is preferred to utilize a demisting mesh of the least expensive and most corrosion-resistant material available in the scrubbing portion of the device. Stainless steels may be most suitable for this application, though even the same mesh as in the catalytic portion of the device can be used.

If a metal mesh is utilized as a demister in a scrubber containing the molten alkali metal carbonate, then a secondary reaction can be made to occur that will further promote and assure removal of NO. This reaction is particularly useful where the exhaust gas contains $CO_2$. It is found that $CO_2$ will promote the removal of NO in the presence of a mesh wetted by the molten carbonate, which also contains coke or other carbonaceous material. Such results are preferably obtainable when the carbonate contains from 5 to 15 weight percent carbonaceous material. Additionally, it is preferred that the carbonaceous material has a particle size of less than 50 microns. The reaction for the $CO_2$-promoted removal of NO in the presence of the mesh and molten carbonate mixture is believed to occur according to the following exemplary equations:

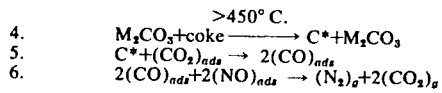

4. $M_2CO_3 + coke \xrightarrow{>450°C.} C^* + M_2CO_3$
5. $C^* + (CO_2)_{ads} \rightarrow 2(CO)_{ads}$
6. $2(CO)_{ads} + 2(NO)_{ads} \rightarrow (N_2)_g + 2(CO_2)_g$ where: $C^*$ is an activated coke species.

It was found that the above reactions will occur to remove NO at relatively short residence times within a reactor containing the mesh wetted with the molten carbonate-coke mixture. At residence times of 1 second or less it was found that the exhaust gas should preferably contain from 5 to 10 volume percent of $CO_2$ in order to achieve NO removal on the order of 80 to 100 percent from the exhaust gas. It appears that if there is at least 5 volume percent $CO_2$ in the exhaust gas, then the efficiency of NO removal becomes independent of any further increases in the amount of $CO_2$.

Where the exhaust gas contains on the order of 5 to 10 volume percent $CO_2$, which amounts will effectively promote removal of NO as indicated above, it has been found that when oxygen concentrations in the exhaust gas exceeds 0.10 volume percent the efficiency of NO removal is significantly reduced. It is postulated that the oxygen uses up both the sites and the reducing species generated by $CO_2$ in reactions with the molten carbonate-coke surface. It is believed that a preferential reaction between the reducing species and oxygen occurs at the expense of the corresponding NO reduction. The $CO_2$-promoted NO removal appears to be independent of CO concentration in the gas.

In order to obtain a most efficient $CO_2$-promoted removal, the mesh should be wetted by the molten carbonate-coke containing mixture. Thus, the metal chosen for the mesh is preferably one which is readily wetted. It has been found that carburized stainless steel is best wetted by the carbonate mixture. Additionally, etched wire mesh is readily wetted. Though the aforegoing are most suited, virtually any metal that will not corrode can be used including plain stainless steel, nickel and even the Monel alloys.

A schematic diagram of a three-stage device that could utilize $CO_2$ to promote nitrogen oxide removal, together with assuring the CO-promoted removal in accord with Reactions 1, is seen in FIG. 1. However, a $CO_2$-promoted NO removal device is also possible without the subsequent stages. In FIG. 1 there is schematically shown an exhaust manifold 11 of an internal combustion engine. Impingement scrubber 13 which constitutes a first stage, is disposed near the exhaust manifold with a line 15 carrying the exhaust gases from the manifold 11 into the scrubber 13. Line 15 directs the exhaust gas downwardly through a portion 17 to impinge against a layer 19 of a mixture of alkali metal carbonates containing coke or other suitable carbonaceous material.

Disposed above layer 19 is a packing metal mesh 21 which serves as a demister to retain the molten alkali metal carbonate within the scrubber 13 and return it to the layer 19 prior to the exhaust gas leaving the scrubber. Additionally, the demister serves as a site for the removal of lead species. Thus, the scrubber can be a separate removable unit that can be changed periodically when the efficiency of the carbonate becomes impaired. An exhaust pipe 23 connects the impingement scrubber to a muffler replacement type unit 25 which is divided into two sections or stages, the first section 27 containing a dry metal mesh of Monel or one of the materials previously mentioned. The section 27 of dry mesh serves as a second stage providing an area wherein Reactions 1 can occur between CO and $NO_x$ to remove the nitrogen oxides. A baffle or similar means separates the first section 27 from a second section or stage 29 which additionally contains a similar metal mesh. Section 29, which becomes the third stage, further has an inlet for air 31 which is mixed with the exhaust gas leaving first section 27, such that Reaction 2 can occur where the CO is converted to $CO_2$. The gas leaves through an exit line 33. It should be pointed out that the portion 29 also affords a means for the oxidation of unburned hydrocarbons to $CO_2$ and $H_2O$.

Figure 2:
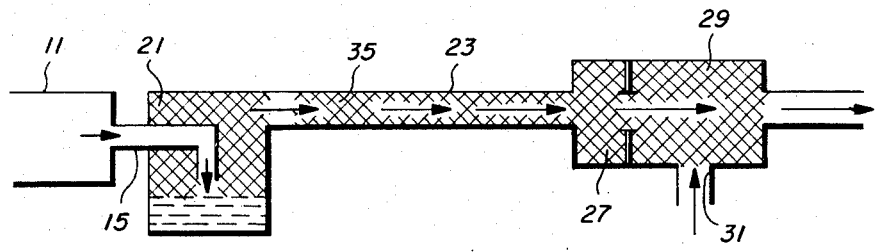
FIG. 2 is a second embodiment of a device suitable for utilization with an internal combustion engine to remove undesirable constituents from the exhaust gas stream.

The embodiment shown in FIG. 2 is essentially the same as the device schematically shown in FIG. 1. However, the difference in the device of FIG. 2 is that the exhaust pipe 23 is packed with a dry metal mesh 35. This enables the region 27 in the muffler replacement unit to be significantly reduced in size since a considerable volume of the mesh required occupies the exhaust pipe. Alternatively, the volume of section 27 in the muffler replacement unit can be maintained in the same size as shown in FIG. 1 thereby increasing the total amount of mesh that can be present within a given exhaust train volume. The volume of section 29 may be identical to that described for FIG. 1.

One of the unexpected results in utilizing the mesh as described in the herein invention is that it can be regenerated in the exhaust environment shown in the figures. It has been recognized in the prior art that lead materials will tend to poison catalytic surfaces. The prior catalysts have reacted with lead to form stable species which are not readily removable. In order to regenerate prior art catalysts so poisoned by the stable species of lead, the catalysts would have to be removed from a device and subjected to extensive treatment. One of the novel aspects in utilizing the copper-containing metal mesh disclosed herein is that lead compounds do not appear to form a stable species with the metal mesh. Thus, if the scrubbing unit does not remove all of the lead from the gas for a short period of time during the operation of the device, the subsequent mesh would become only temporarily poisoned. It has been found, for example, when a lead-free gas is directed over a poisoned metal mesh, the lead species will be purged from the surface of the mesh. This purging serves to allow the mesh to recover some of its catalytic efficiency. This indicates that the lead will not form a stable species on the metal mesh surface, but rather can be at least partially removed when purged with a subsequent lead-free gas. It is expected that continued purging with a reducing gas at high temperature would fully regenerate the catalyst.

Figure 3:
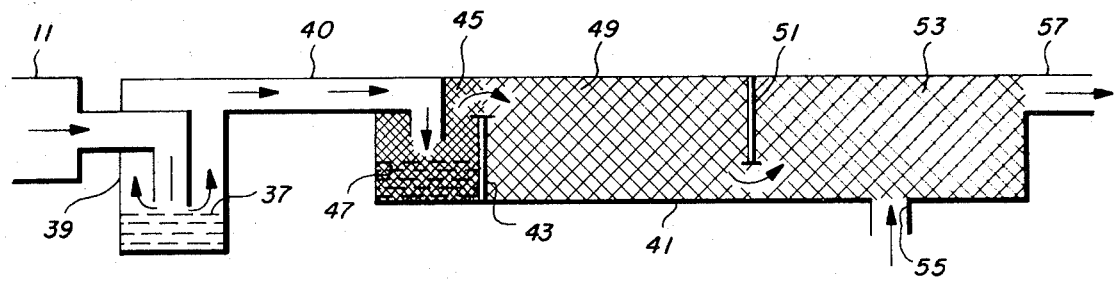
FIG. 3 is a third embodiment of a device suitable for utilization with an internal combustion engine to remove undesirable constituents from the exhaust gas stream.

Obviously, lead-poisoning with the attendant need to regenerate the catalyst is undesirable because of the inefficiency of the catalyst during the time period before regeneration has been accomplished. To make particularly sure that complete lead removal occurs at all times, attention is directed now to FIG. 3 which in effect is still a three-stage device. However, the first stage is broken down into two separate units to most effectively remove lead impurities from the exhaust gas. In this embodiment gas from an exhaust manifold 11 is impinged upon a molten carbonate surface 37 within a housing or can 39. It is noted that unlike the previous embodiments there is no demisting mesh in this device which serves as a first scrubber for lead halide removal. The impingement should not entrain sufficient molten carbonate to plug downstream lines such as 40, leaving the first scrubber, or to cause any other undesirable effects. Thus the gas containing some entrained carbonate will leave the first scrubber through line 40 toward a separate unit 41 which could, for example, replace a conventional muffler in an automobile. The unit 41 contains an area defined by baffle 43 which contains a metal mesh 45 preferably of a metal which is readily wetted by a layer of molten carbonate. This serves as a second scrubber in the device. The gas from line 40 leaving the first scrubber 39 is directed into the mesh 45, impinging upon the carbonate 47. It is to be noted, however, that in this embodiment the mesh 45 is not only placed above the carbonate but further is embedded therein to provide an interface between the carbonate and the mesh. The presence of the mesh in the carbonate can improve lead removal efficiencies, while the portion of the mesh extending above the carbonate will serve as a demister so that the gas leaving the second portion of the scrubber will be free of poisons when entering the dry metal mesh 49 where Reactions 1 can occur. A baffle or other means 51 can divide the section 49 from a last third stage 53 which additionally contains a catalytic mesh and has an air inlet 55 in the manner described in the previous embodiments so that CO and unburned hydrocarbons can be effectively oxidized prior to the gases leaving through the final exit line 57.

EXAMPLE 1

$NO_x$ Removal in Presence of CO

A series of runs were conducted by directing a gas over a dry mesh catalyst contained in a small reactor. The reactor utilized was a cylindrical vessel formed of stainless steel having an inlet at the bottom thereof and an outlet at the top so that the gas could be directed therethrough. A plurality of baffles was disposed in the reactor to assure that the gas would be well circulated to flow over the mesh. The inlet line carrying the gas into the reactor intersected the bottom wall thereof and directed the gas above the bottom surface of the reactor to a point adjacent to a diffuser against which the gas impinged and was directed downwardly and outwardly against the walls of the reactor. The mesh was disposed within the reactor above the diffusing element and occupied a volume of about 100 cc within the reactor. A carrier gas of helium was utilized for the various runs. Concentrations of $NO_x$ were varied together with the concentration of oxygen and CO to determine the relative effect of these constituents upon each other in the presence of the dry mesh. The concentration of the $NO_x$ was measured on a Scott $NO_x$ analyzer; $O_2$, $N_2$, CO and $CO_2$ concentrations were determined an a gas chromatograph. The flow rates were determined utilizing a wet test meter while the temperature of the gas was determined by conventional thermocouples.

Fifty grams of active wire mesh were utilized in the experiments, thus providing a density of 0.5 grams/cc of the mesh in the reactor. This combination of mesh packing and appropriate baffles occasioned pressure drops of < 1.5 psi through the reactor at all flow rates employed. No attempt was made, however, to optimize the catalyst performance by the use of this particular packing density. Rather, the 0.5 grams/cc was arbitraily chosen to allow convenient interexperimental comparisons with the minimum of mesh preparation. It is expected that optimization of packing density and baffling arrangement could result in even better catalyst performance than was obtained in the given experiments.

In the experiments, the $NO_x$ concentration varied from 1,000 to 2,000 ppm which is equivalent to a range of 0.10 to 0.20 volume percent. The oxygen concentration varied between 0.50 and 2 volume percent of the gas stream. The gas was preheated by passing it through a stainless steel pebble-bed heater, while the reactor was placed in a pot furnace to maintain the gas temperature. Additionally, the residence time of the gas in the reactor was varied from run to run, in accordance with the variance of flow rates of the gas through the reactor. This was done to determine the effect of residence time upon the reactions. Residence time, as defined for these experiments, is the volume occupied by the mesh divided by the gas flow rate at reactor temperature.

As indicated in the specification, if both NO and $O_2$ are present in the gas, two reactions compete for available CO. As can be seen from the equations, each molecule of NO requires only 1 molecule of CO, while each molecule of $O_2$ requires 2 of CO. The basic requirement for efficient $CO-NO_x$ reaction is that the concentration of CO be in excess of that required to completely convert all oxygen to $CO_2$. Thus the critical variable in the CO-promoted $NO_x$ removal reaction is that there be excess CO present, which means excess CO above that required to react with all the oxygen in the gas. In the oxidization of CO to $CO_2$, the oxygen must be present in excess of that required to convert all of the CO to $CO_2$. Thus, in the following tables the three main variables are given and the percent of either $NO_x$ or CO removal indicated. The three variables are the residence time of the gas in the reactor, the temperature of the gas, and the excess of a particular gaseous component which is needed to promote either one of the aforegoing reactions. As can be seen, the three tables indicate the variance of the type of mesh utilized, since Monel, type 304 stainless steel and nickel mesh were all separately used. Thus, looking at Table 1 it can be seen that at a gas temperature of ±525° C. and a residence time of 0.08 seconds, 95 percent NO removal was achieved where there was a 3.5 volume percent excess of CO in the gas. By the term 3.5 volume percent excess of CO there is meant that the amount of CO in the gas for this run exceeded by 3.5 percent that required to react with all of the oxygen present in that gas. Additionally, at the same residence time of 0.08 seconds and a temperature of about 550° C., 90 volume percent of CO was removed from a gas which contained 0.40 volume percent stoichiometric excess of that amount of $O_2$ required to react with the CO to convert it to $CO_2$.

TABLE 1

Monel 400 Mesh

| Residence Time(sec) | Temperature (°C.) | Condition for Specified Removal Efficiency |
|---|---|---|
| 0.08 | ≧ 525 | 3.5% excess CO for 95% NO removal |
| 0.08 | = 550 | 0.4% excess $O_2$ for 90% CO removal |
| 0.12 | ≧ 500 | 3.5% excess CO for 100% NO removal |
| 0.12 | = 600 | 2.5% excess CO for 95% NO removal |
| | | 0.5% excess $O_2$ for 95% CO removal |
| | = 525 | 0.5% excess $O_2$ for 90% CO removal |
| | = 450 | 0.5% excess $O_2$ for 75% CO removal |
| 0.16 | ≧ 500 | 1.0% excess CO for 100% NO removal |
| | | 0.5% excess CO for 95% NO removal |
| 0.16 | = 550 | 0.4% excess $O_2$ for 100% CO removal |
| | = 550 | 0.1% excess $O_2$ for 98% CO removal |
| 0.4 | ≧ 375 | 0.5% excess CO for 100% NO removal |
| | | 0.1% excess CO for 95% NO removal |
| | = 300 | 1.0% excess CO for 90% NO removal |
| | = 250 | 1.0% excess CO for 50% NO removal |
| 0.4 | ≧ 325 | 0.5% excess $O_2$ for 100% CO removal |
| | = 250 | 0.3% excess $O_2$ for 80% CO removal |

TABLE 2

304 SS Mesh

| Residence Time(sec) | Temperature (°C.) | Condition for Specified Removal Efficiency |
|---|---|---|
| 0.08 | = 550 | 3.5% excess CO for 5% NO removal |
| 0.08 | = 550 | 1.5% excess $O_2$ for 5% CO removal |
| 0.16 | = 500 | 4% excess CO for 10% No removal |
| 0.4 | = 540 | 7.1% excess CO for 40% NO removal |

TABLE 3

Nickel Mesh

| Residence Time(sec) | Temperature (°C.) | Condition for Specified Removal Efficiency |
|---|---|---|
| 0.12 | = 500 | 3.5% excess CO for 90% NO removal |
| 0.16 | = 520 | 5% excess CO for 85% NO removal |
| 0.16 | = 500 | 4.7% excess $O_2$ for 95% CO removal |
| 0.4 | = 540 | 3.3% excess CO for 70% NO removal |

From Table 1, it can be seen that 100% NO removal can be readily obtained with as little as 1.0 percent excess CO present when a Monel mesh is used. Additionally, it can be seen that 100% CO removal can be achieved with as little as 0.4 percent excess oxygen.

The three tables further serve to illustrate the unexpected results obtainable with a copper-containing alloy, such as the Monel mesh utilized to obtain the results of Table 1.

Comparisons of the results shown in Table 1 with those of Table 2 illustrate the superiority of Monel mesh over stainless steel mesh. For example, the results shown in the first line of each table were obtained under essentially identical experimental conditions, with 95% NO removal obtained using Monel 400 and only 5% NO removal using 304 stainless steel. For $CO-O_2$ reaction, Monel is again superior as can be seen by comparing the second line of each table wherein the Monel 400 mesh promoted 90% CO removal while 304 stainless steel mesh could only promote 5% CO removal.

Similar comparisons can be made between the results shown in Table 1 and those obtained using the nickel mesh of Table 3. Again, the advantage is clearly with Monel as illustrated by comparing line three of Table 1 with line one of Table 3, wherein Monel promoted 100% NO removal while nickel promoted only 90% NO removal. For the $CO-O_2$ reaction, comparison of results obtained at 0.16 second residence time again appears to favor the use of Monel over nickel.

It is also to be noted that at the residence times of 0.16 and 0.4 seconds, significantly greater excesses of CO are required to efficiently remove NO over the nickel mesh than are required over the Monel mesh.

It can be seen in the tables that no mention is made of the efficiency at which $NO_2$ can be removed. Since $NO_2$ is more reactive than NO, 100% $NO_2$ removal is obtained using the mesh catalysts under any conditions in which 50% NO removal can be obtained. When nitrogen is substituted for helium as the carrier gas, no reduction in the efficiency of the catalyst occurs. Further, the additional presence of as much as 12 volume percent water vapor has no deleterious effect on Reactions 1. Hexane, heptane, and benzene vapors in concentrations of from 0.10 to 1.0 volume percent appear to in fact increase the removal of $NO_x$ over a Monel mesh catalyst. Thus hydrocarbons present in the gas appear to enhance the performance of the Monel mesh, rather than acting to poison it.

$NO_x$ removal was also obtained when an oxygen-free $NO_x$-containing gas mixture, also containing from 0 to 5% $CO_2$ and 5% CO, was passed over a Monel mesh wetted with a molten mixture of alkali metal carbonates free of any added carbonaceous material. For a residence time of 0.6 seconds and at a temperature of 525° C., about 50% of the $NO_x$ originally present was removed. The removal of $NO_x$ was not affected by the amount of $Co_2$ present.

EXAMPLE 2

$CO_2$-Promoted NO Removal

The same reactor and equipment used in Example 1 were utilized to determine the $CO_2$-promoted nitric oxide removal mechanism. However, in this series of runs, the mesh was wetted with a mixture of molten alkali metal carbonate salt and fluidized coke, where the fluidized coke varied from 5 to 15 weight percent of the mixture. The wetting was accomplished by immersing the given mesh in the mixture and then draining and blowing the excess $M_2CO_3$-coke from the mesh surface. A carrier gas of helium which contained varying amounts of $O_2$, $CO_2$, CO and NO was utilized. The concentration of the inlet NO ranged from 1,000 to 2,500 ppm during the tests. The amounts of $O_2$, $CO_2$, and CO in Table 4 are in volume percent of the gas passing through the reactor.

TABLE 4

| Mesh | Residence Time(sec) | Temp. (°C.) | $O_2$ | $CO_2$ | CO | NO Removal |
|---|---|---|---|---|---|---|
| 304 SS | 1.0 | 525 | none | 6% | 0–3% | 90–100% |
| 304 SS | 0.3 | 525 | none | 6–10% | 0–3% | 50% |
| 304 SS | 0.3–4 | 525 | 0.1% | 6–10% | 0–3% | <5% |
| 304 Carburized SS | 1.0 | 525 | none | 6–10% | 0–3% | 100% |
| 304 Carburized SS | 0.3 | 525 | none | 6–10% | 0–3% | 60–90% |
| 304 Carburized SS | 0.3–4 | 525 | 0.1% | 6–10% | 0–3% | <10% |
| Monel | 0.8 | 575 | 1% | 6% | 2–3% | 25% |
| Ni | 0.5 | 525 | none | 5–6% | <1–3% | 100% |
| Ni | 0.5 | 525 | 0.2% | 5% | <1–3% | 30–40% |
| Ni | 0.3 | 525 | none | 6% | <1–4% | <80% |
| Ni | 0.3 | 525 | 0.1% | 6% | <1–4% | 60% |
| Ni | 0.3 | 525 | 0.2% | 6% | <1–4% | 20% |

As can be seen from the above Table 4, the efficiency of the $CO_2$-promoted NO removal was hindered by the presence of oxygen in the gas stream. Alternatively, where the amount of CO varied between 0 and 4 volume percent there appeared to be no effect on the reaction. Thus, the significant variables for the $CO_2$-promoted nitric oxide removal appear to be the presence of $CO_2$, residence time, temperature, and oxygen concentration. As can be further noted from the above table, wetted nickel mesh had the greatest tolerance for the presence of $O_2$. However, wetted plain or carburized 304 stainless steel had excellent nitrogen oxide removal capability in the absence of oxygen.

EXAMPLE 3

The reactor previously described was packed with a Monel mesh and a mixture of helium, CO, $CO_2$ and $NO_x$ was passed through. The residence time was 0.3 second, and the reactor temperature maintained at 525° C. The $CO/O_2$ ratio was adjusted to allow 100% $NO_x$ removal. Lead chloride was then introduced into the gas stream at the rate of more than 0.1 mg/l. Within 15 minutes the $NO_x$ removal efficiency was reduced to zero, thus indicating lead poisoning of the catalyst. The lead injector was then allowed to cool, while maintaining a small helium flow through it. The initial lead addition plus the smaller additions while cooling the lead injector indicated that an estimated total of several hundred mg of $PbCl_2$ was passed into the reactor.

The basic gas flow, then containing no $PbCl_2$, was continued for an additional 15 hours, at which time the $NO_x$ removal efficiency had recovered to 30 percent. When the mesh was analyzed for lead at the end of this period, it was found that less than 20 mg of lead was present in the reactor. Since this represented only a fraction of the PbCl₂ introduced, it was concluded that the recovery of catalytic efficiency was accomplished by revolatilizing the lead poisoning agent into the lead-free gas stream.

EXAMPLE 4

Utilizing two of the reactors previously described, a two-stage experiment was then conducted. The residence time in each was 0.3 second. The first reactor contained a Monel mesh wetted with an alkali-metal molten carbonate salt mixture, while the second reactor contained dry Monel mesh. A gas stream of helium containing ~1,500 ppm $NO_x$ and about 2 percent excess CO over that required to react with $O_2$ was utilized. Lead chloride was introduced into the gas stream at a rate of $1.5 \times 10^{-4}$ g/l for 50 hours over a total test period of 150 hours. The first reactor containing the wetted mesh was found to remove 99.98 weight percent of the lead, allowing only approximately 2 mg to pass through into the dry mesh stage. About 90 percent of the injected PbCl₂ was found in the bottom of the reactor, with the additional 9.98 percent found on the wetted mesh. $NO_x$ removal efficiencies of 100 percent were sustained over the entire 150 hour test. During the run, the temperature of the wetted mesh reactor was about 525° C. and that of the dry mesh reactor was about 500° C. It is to be noted that the concentration of the PbCl₂ in this experiment corresponded to about three times the normal concentrations found in automobile exhaust. The reactor used to remove the lead acted as a scrubber, with the wetted mesh section effectively demisting any lead chloride or molten carbonate which could be entrained in the gas.

It will of course be understood that various modifications can be made in the design and operation of the present invention without departing from the spirit thereof. Thus, while the principle, preferred construction, and mode of operation of the invention have been explained and what is now considered to represent its best embodiment has been illustrated and described, it should be understood that within the scope of the appended claims the invention may be practiced otherwise than as specifically illustrated and described.

I claim:

1. A method of treating a hot CO₂-containing automotive exhaust gas resulting from the combustion of a leaded gasoline to remove impurities therefrom including nitrogen oxides, CO and lead halides which comprises, in combination:

contacting said hot automotive exhaust gas in a first stage with a molten salt containing as active absorbent a ternary mixture of the carbonates of lithium, sodium and potassium to remove at least a portion of said lead halides, then passing said exhaust gas through an active demister metal mesh to further react lead halide present in said gas with the active absorbent salt on the surface of said mesh while de-entraining the molten salt thereon from said gas, and then directing the dry lead-free gas to a second stage containing a lead-sensitive dry catalyst for effecting a reaction between the CO and nitrogen oxides to form nitrogen and carbon dioxide.

2. The method of claim 1 wherein said dry catalyst is a metal mesh.

3. The method of claim 2 wherein said metal mesh is of a copper alloy containing from 5 to 95 weight percent copper.

4. The method of claim 3 wherein said alloy contains from 25 to 30 weight percent copper, from 60 to 70 weight percent nickel, and optionally contains amounts of iron up to 6.5 weight percent and lesser amounts of silicon, manganese, and carbon.

5. The method of claim 1 wherein said gas after contact with said dry catalyst in said second stage is directed to a second catalyst in a third stage for effecting the oxidation of both the CO and hydrocarbons present in said gas.

6. The method of claim 5 wherein after said gas has contacted said dry catalyst sufficient oxygen is added to said gas to effect the oxidation of CO and hydrocarbons present while contacting said second catalyst.

7. The method of claim 6 wherein both the dry catalyst and the second catalyst are of substantially identical materials.

8. The method of claim 7 wherein both of said catalysts comprise a metal mesh.

9. The method of claim 8 wherein said metal mesh is of a copper alloy containing from 5 to 95 weight percent copper.

10. The method of claim 9 wherein said alloy contains from 5 to 95 weight percent copper and from 5 to 95 weight percent nickel.

11. The method of claim 10 wherein said alloy contains from 25 to 30 weight percent copper, from 60 to 70 weight percent nickel, and optionally contains amounts of iron up to 6.5 weight percent and lesser amounts of silicon, manganese, and carbon.

12. The method of claim 1 wherein said gas contains at least five vol. per cent CO₂ and wherein said molten salt also containing a solid carbonaceous material substantially wets the surface of said active metal mesh to promote the reaction between nitrogen oxides and carbon monoxide to form nitrogen and carbon dioxide.

13. A method of removing at least nitrogen oxide impurities from CO₂-containing waste gases, also containing carbon monoxide including automotive exhaust gas comprising:

providing a metal mesh, wetting said mesh with a molten salt mixture containing a ternary mixture of alkali metal carbonates and a solid carbonaceous material and, passing said gas through said wetted mesh to promote the reaction between nitrogen oxides and carbon monoxide to form nitrogen and carbon dioxide.

14. The method of claim 1 wherein said active demister metal mesh is of a stainless steel.

* * * * *